Figure 1:
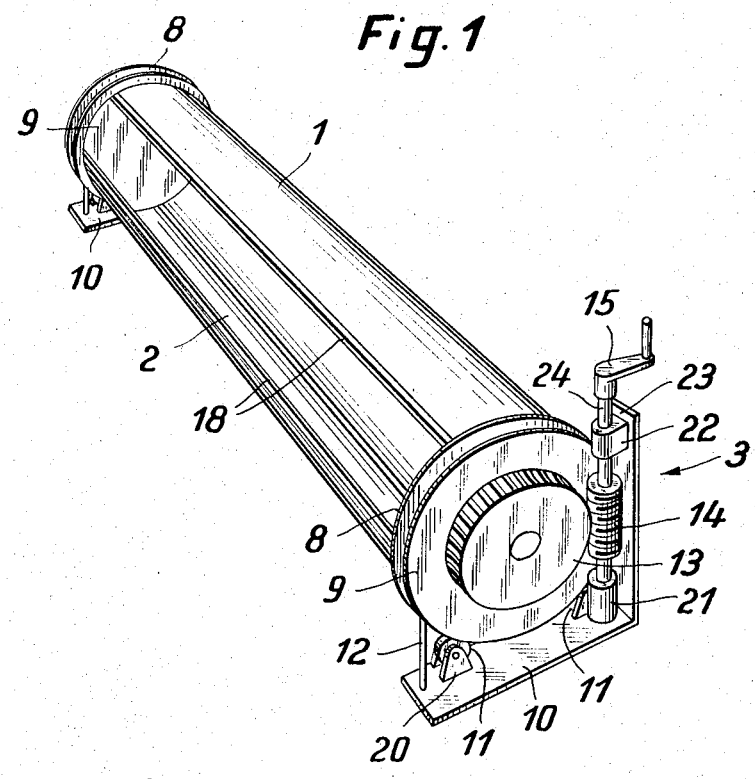

Dec. 26, 1967  H. BIEHL  3,359,947
FEEDING DEVICES FOR ANIMALS, MORE ESPECIALLY PIGS
Filed Sept. 27, 1965  3 Sheets-Sheet 1

INVENTOR.
Heinrich Biehl
BY Beaman & Beaman
atty.

Dec. 26, 1967     H. BIEHL     3,359,947
FEEDING DEVICES FOR ANIMALS, MORE ESPECIALLY PIGS
Filed Sept. 27, 1965     3 Sheets-Sheet 2
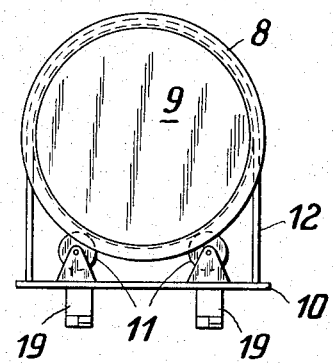
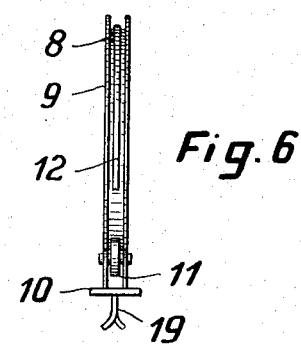
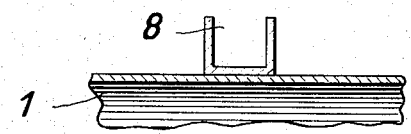
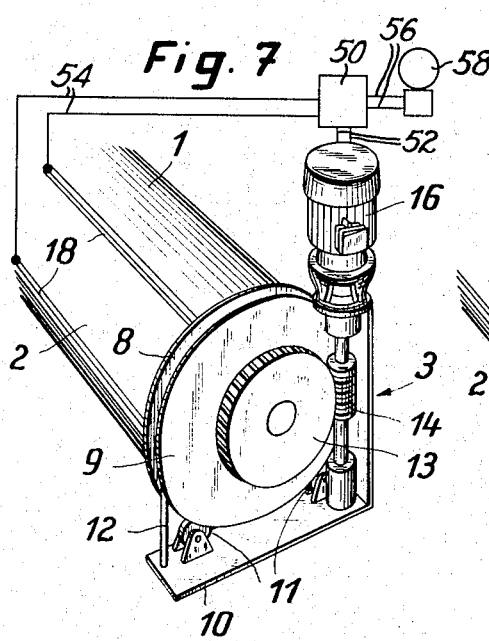
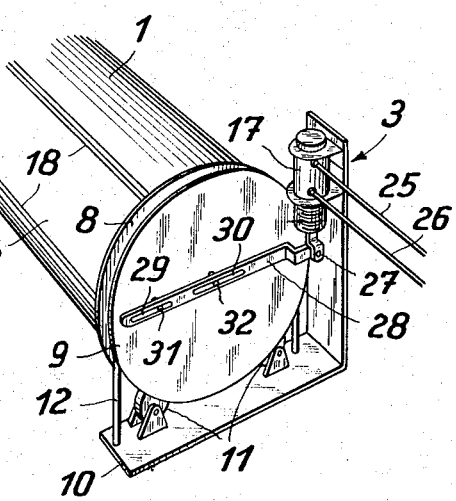
INVENTOR.
Heinrich Biehl
BY Beaman & Beaman
attys

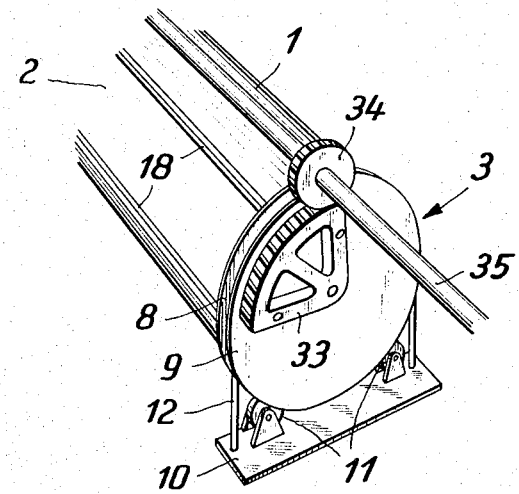
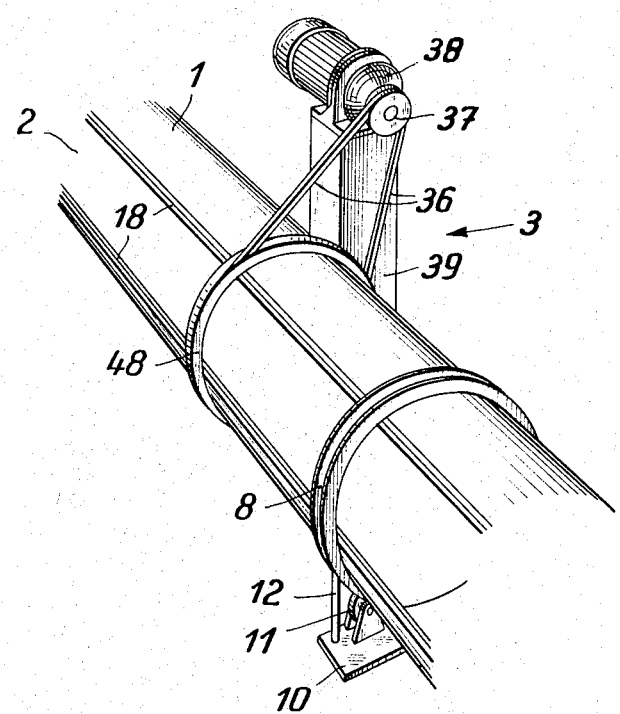

United States Patent Office 3,359,947
Patented Dec. 26, 1967

3,359,947
FEEDING DEVICES FOR ANIMALS, MORE
ESPECIALLY PIGS
Heinrich Biehl, Witzhave, near Trittau, Germany
Filed Sept. 27, 1965, Ser. No. 490,404
Claims priority, application Germany, June 4, 1965,
B 82,282
9 Claims. (Cl. 119—51.12)

This invention relates to feeding devices for animals, more especially pigs, comprising at least one comparatively long trough arranged substantially horizontally.

Known feeding troughs generally consist of comparatively long clay or stoneware dishes of semicircular section of a diameter suitable for the species and size of animals to be fed. These troughs are manufactured in predetermined lengths, for example 1 meter, and are arranged end to end and firmly fixed on a stone or concrete base until the desired overall length is achieved. Such troughs are arranged adjacent to or in a partition of the pen either so that the animals have continual access to the trough or so that the trough can be optionally barred to the animals by means of a movable partition which may be either of imperforate or lattice construction. The partition may be arranged for slidable movement or may be hingedly mounted.

In order to increase the economic return on animal rearing, in recent years the practice has been increasingly adopted of carrying out the labour involved in feeding and tending animals by mechanical, and preferably, automatic means. More especially it has been the aim to improve feeding techniques by the use of feeding machines. With troughs as hitherto known, however, a satisfactory feeding procedure, whether mechanised or automatic, has not been achieved. It frequently occurs that the animals dirty the trough or lie in it, so that constant supervision and frequent cleaning are necessary. If the trough is constructed in a conventional manner to be optionally cordoned off by movable partitions, difficulty is experienced in preventing the animals being injured by getting caught in the equipment, and in moving the partitions reliably over extended periods of time against the active opposition of the animals. Moreover the partitioning complicates visual inspection of the pen and also any work, such as cleaning operations, which have to be undertaken on that side of the pen occupied by the trough. Further, due to the shallow nature of the troughs of semi-circular section, it is a frequent occurrence for some of the feed to slop over when relatively liquid feeds are being distributed, especially when this operation is performed automatically. Hence, in practice automaticity, or even mere mechanisation, of feeding procedures is not feasible in the case of troughs as now known. Furthermore, known troughs possess the disadvantage that they are relatively heavy and yet fragile and, because of their being secured on stone or concrete bases, they impede the introduction of any desirable alterations of layout in the pen.

As part of the development work leading up to the present invention attempts were made to design troughs as now known, or of a similar kind, but able to be moved horizontally or downwardly, so as to effect complete separation of the animals from the feed in the trough. Such devices, however, proved relatively complex and costly, and were in any case not completely satisfactory in use. Proposals have also been made to improve the feeding procedure by having the animals constantly supplied with a full trough the contents of which may, for example, be kept automatically at a predetermined level. The results obtained from this kind of self-feeding are, however, unsatisfactory. Apart from the danger that, by reason of the possibilities already referred to, the animals may foul the trough or the automatic feed mechanism it has been demonstrated that with self-feeding an undesirable increase of fat in the body of the animal occurs—an increase that is financially valueless in the case of animals for slaughter and that adversely affects desired outputs in other animals (for instance, egg production figures for poultry).

The invention solves the problem of providing a feeding device which may be manufactured economically, which does not have the disadvantages mentioned above and which makes possible economical and appropriate feeding of the animals with a minimum expenditure of labour.

According to the invention the trough of an animal-feeding device comprises a pipe having a longitudinal feeding slot therein which extends over an arc of the circumference of the pipe subtending an angle of less than 180° at the axis, the pipe having bearings enabling it to turn about its axis and being connected to a driving device which permits the pipe to turn through an angle between a feeding position, in which the feeding slot is turned towards the animals to be fed, and a neutral position in which the feeding slot is inaccessible to the said animals.

When the feeding device according to the invention is in its neutral position the closed, rounded and smooth exterior wall of the pipe is turned towards the animals; there is thus no possibility of the feeding slot becoming fouled by the animals. Moreover the feeding slot, when turned away from the pen, can be filled in comfort and, if desired, automatically. In view of the relatively small arc over which the feeding slot extends, and which as already stated subtends an angle of less than 180° at the axis of the pipe, the danger of slopping feed over as it is put in is in practice eliminated. Cleaning of the feeding slot, when it is in the neutral position and so turned away from the pen, may also be very easily carried out. The pipe itself acts as a partition of the pen, so that in most instances it is unnecessary to provide an additional unbroken partition above the pipe; in any event, wide-mesh lattice-work, an electric fence or the like as proposed in accordance with a further feature of the invention serves as an additional barrier. Due to this arrangement the pen can be more easily inspected and better ventilated. Cleaning from the side of the pen occupied by the trough can also be carried out more easily. The requirement for the space that would be taken up by movable, for example, sliding, partitions no longer arises.

Upon turning the pipe from the feeding into the neutral position, the nozzles or snouts of the animals located in the feeding slot are pressed upwardly and removed from the slot by the lower edge of the latter as it moves upwards and outwards, without any possibility of injury to the animals arising. According to the aforesaid further feature of the invention this procedure may be helped by the installation of an electric fence of known type above the pipe. By this means as the heads of the animals are pressed upwards they finally come into contact with the electric fence, which causes the animals to withdraw rapidly from the pipe. The turning movement of the pipe can be effected mechanically by very simple means. It is evidently an easy matter to connect up several substantially coaxially arranged pipes and make them turn by a common driving device. Thus, the feeding device according to the invention renders it possible to mechanise or automatically produce the feeding procedure in a simple, inexpensive and reliable manner.

The pipe may be made of any suitable material, for example, stainless steel, enameled steel, aluminium or plastics. According to another feature of the invention it is particularly advantageous to make the pipe from a fibrereinforced plastic material, more especially a polyester resin reinforced with glass fibres. By reason of the high elasticity, stability and lightness of this material the pipes according to the invention may be produced, despatched and installed in relatively long lengths. Intricate and costly work on foundations is not necessary. Moreover there are no difficulties to overcome in designing the pipe so that it can contain a whole day's ration or an even larger amount of feed, with the result that a considerable saving in labour may be effected through the elimination of frequent filling operations. Cleaning of the pipe is also facilitated by the smooth surface of the pipe.

According to yet another feature of the invention the driving device may be linked to a programmed control mechanism which is so set that at predetermined times the troughs are brought for predetermined periods into the feeding position, but are otherwise maintained in the neutral position. By this means a very considerable degree of automaticity in the feeding of the animals can be provided. With such an automatic installation there is no additional expenditure if the number of feeds per day is increased and, on the other hand, the length of the individual feeding periods is shortened. It has been shown that by offering the day's ration of feed in several small portions a better feed conversion figure and a more favorable output ratio can be obtained. For instance, it has been proved in relation to pig-fattening that by this dividing of the feed rations into several smallish portions the fattening period is shortened by up to 20% and a diminution in the feed requirement per unit of live weight of likewise up to 20% is achieved.

The reason for this favourable result is almost certainly the fact that after a predetermined period for feeding the full trough is always turned away from the animals. This leads to the animals being considerably stimulated, with enhanced muscle movements, a livelier digestive process possibly combined with simultaneous favourable influencing of digestive microorganisms inside the animals, and an intake of food that is larger overall.

In accordance with a further feature of the invention a signalling device may be provided which comprises at least one audible signal emitter and is connected with the programmed control mechanism, the latter being so designed that an audible signal is emitted shortly before the end of each feeding period. Furthermore, according to the invention, the programmed control mechanism may be so designed that an audible signal is given shortly before the commencement of each feeding period, the said signal according to the invention varying from that given before the end of the feeding period, being differentiated from the latter in that it emits another note. Experiments have demonstrated that the animals soon become accustomed to these signals and station themselves before the trough when the feeding period is announced. By this means full exploitation of the feeding period is invariably ensured.

According to a still further feature of the invention the longitudinal margins of the feeding slot may be provided with a metal strip. In accordance with the invention the metal strip may be connected to a source of electric current, the voltage of which is such that animals coming into contact with the metal strip receive a deterrent electric shock. In this connection the programmed control mechanism according to the invention may be so arranged that at the end of the predetermined feeding period the metal strip is traversed by an electric current. By so employing the metal strip, on the one hand damage to the trough by the animals is prevented and on the other hand it is possible to give the animals a deterrent shock before the end of the particular feeding period. When the above-mentioned acoustic signal is employed the animals, as experiments up to now have demonstrated, withdraw of their own accord from the trough when the signal sounds, once they have experienced on two or three occasions the effect of the metal strip having an electric current therein.

Figure 2:
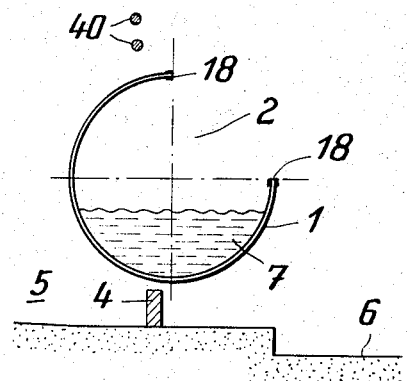
Figure 3:
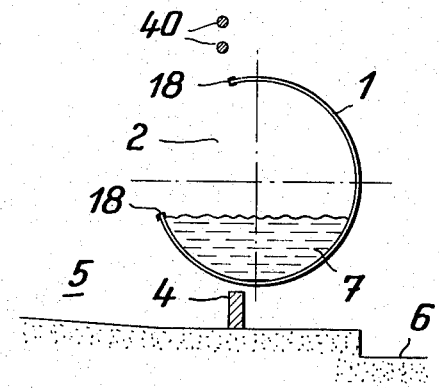

Further features and advantages of the invention will be apparent from the following description of the several embodiments thereof illustrated in the accompanying drawings. In the drawings:

FIGURE 1 is a diagrammatic perspective view of a feeding trough according to the invention, FIGURE 2 illustrates in diagrammatic section a feeding trough according to the invention in its neutral position, FIGURE 3 is a diagrammatic section corresponding to that of FIGURE 2 but in the feeding position, FIGURE 4 is a diagrammatic view from the end of a feeding trough according to the invention without a driving device, FIGURE 5 illustrates diagrammatically in partial section a reinforcement ring for the trough, FIGURE 6 is a diagrammatic view, in the traverse direction, of one end disc of a feeding trough according to the invention, FIGURE 7 is a perspective view, corresponding to that of FIGURE 1, of a second possible construction of driving device for the feeding trough, FIGURE 8 is a similar view to FIGURE 7 of a third construction of driving device, FIGURE 9 illustrates diagrammatically a fourth construction of driving device, and FIGURE 10 illustrates diagrammatically a fifth construction of the driving device.

As will be seen from FIGURE 1, the embodiment of the invention therein diagrammatically illustrated consists of a comparatively long feeding trough in the form of a pipe 1 of plastic material reinforced with glass fibres and closed at either end by discs 9, the pipe being mounted on bearings to enable it to turn about its axis upon rollers 11. In the pipe 1 there is provided a longitudinal feeding slot 2 which extends over about one sixth to one quarter of the circumference of the pipe. The discs 9 which seal the ends of the pipe are provided around their peripheries with a track 8, illustrated in the form of a U-shaped rail profile by means of which they rest upon the supporting rollers 11. It is, however, possible to construct the periphery of the disc 9 so that it is smooth and to form the rollers 11 with a profile such as to prevent the disc 9 from slipping sideways off the rollers. The rollers 11 are carried in pillow blocks 20 which in turn are secured to a base plate 10. The latter is held to the floor of the pen, for example by means of the anchoring units 19 shown in FIGURES 4 and 6. To one end disc 9 a gear 13 is attached which engages with a worm 14 mounted to revolve in two bearings 21 and 22. These bearings are located on a flange 2 upstanding from and set to one side of the base plate 10. On the axle 24 of the worm 14 a cranked handle 15 is provided so that by turning the said handle the pipe 1 can be made to turn about its longitudinal axis.

FIGURES 2 and 3 illustrate the movement of the pipe 1. As will be seen from these figures, the pipe 1 may be arranged above a low vertical barrier wall 4 of a pen 5, preferably at such a height that the animals in the pen 5 can certainly feed in comfort from the feeding slot 2 when it is in the feeding position (FIGURE 3) but cannot step into the pipe 1. Above the pipe 1 there is arranged an electric fence 40 of a type already known. When the pipe 1 is in the attitude shown in FIGURE 2 the feeding slot 2 is located on the other side of the partition formed by the wall 4 and the electric fence 40, and can be supplied in comfort with feed 7 from the passage-way 6. FIGURE 3 illustrates the pipe 1 in the feeding position, into which it moves from the neutral position shown in FIGURE 2 by making a counterclockwise turn. As will be seen without difficulty from FIGURE 3, the animals in the pen 5 have available a large feeding slot from which feed can be easily consumed. At the end of the predetermined feeding period the pipe 1 is once more turned back to the neutral position shown in FIGURE 2 by a clockwise rotational movement. If the pipe 1 is arranged so that it lies at a sufficiently high level in relation to the size of the animals using the feeding device, the animals are compelled by the upward clockwise movement of the lower longitudinal margin of the slot 2 to withdraw their snouts from the trough if they wish to avoid coming into contact with the electric fence 40. According to the invention the animals may also, however, be scared away from the trough shortly before the termination of the predetermined feeding period by means of an electric shock that is independent of the electric fence 40. For this purpose the longitudinal margins of the feeding slot 2 are provided with metal strips 18 which may be connected in any suitable manner (not shown) to a source of electric current having an adequate voltage, for instance with the assistance of flexible leads or sliding contacts.

As FIGURE 2 shows, in the case of the feeding slot illustrated therein, which extends over a quarter of the circumference of the pipe, there is no danger of a portion of the feed slopping over as the pipe is filled with liquid or semi-liquid feed. This is particularly important when employing automatic or semi-automatic filling devices.

In FIGURE 4 one possible construction of end disc 9 is shown in greater detail. The track 8 for the supporting rollers 11 which is formed around the periphery of the end disc 9 and is coaxial with the pipe 1 has in this case a U-profile the side legs of which grip the rollers 11 laterally and thus prevent axial displacement of the pipe 1. Furthermore, to prevent the pipe 1 from lifting off the supporting rollers 11, a U-shaped safety hoop 12 is provided, the ends of which are anchored, although not permanently fixed, to the base plate 10 or to the floor by means of arrangements (not shown). This safety hoop 12 extends around the track in the U-profile. As the pipe only needs to be turned through a small angle it is not absolutely essential to make the track 8 extend round the whole circumference of the pipe 1.

In the case of longer lengths of pipe it may be desirable to support the pipe additionally between each end either in one place or in several places. For this purpose, in places determined by the stiffness of the pipe, it is possible to provide further supporting rollers on which the pipe rests so as to be capable of turning. At these places it is practical to fix reinforcement rings 8 which may have a U-profile opening to the outside for the reception of rollers. Such a reinforcement ring 8 with a U-profile is diagrammatically illustrated in partial section in FIGURE 5.

FIGURE 6 illustrates, in an edge view of the disc 9, the U-profile opening to the outside, the curved safety hoop 12, the lower end of which is broken away, the rollers 11 and the anchoring unit 19.

FIGURES 7 to 10 illustrate further possible embodiments of the driving mechanism 3. In the embodiment shown in FIGURE 7 the cranked handle 15 is replaced by an electric motor 16 which drives the shaft 24 through reduction gearing. In the embodiment according to FIGURE 8 the drive for the pipe 1 is effected by a pneumatic or hydraulic cylinder 17 with associated piping 25 and 26. The actuator 27 of the hydraulic cylinder is hingedly connected to the end of a bar 28 which slides with its two slots 29 and 30 along two studs 31 and 32. Naturally any other suitable arrangement of bars between an operating cylinder and the pipe may be used to effect the angular movement of the pipe about its axis.

FIGURE 9 illustrates diagrammatically a drive for the pipe 1 which includes a toothed segment 33 secured to one of the end discs 9 and engaging with a pinion 34. The pinion 34 is fixed on a shaft 35 which extends above the pipe 1 and can be made to revolve by a driving motor (not shown). By this arrangement it is a simple matter to drive several coaxially arranged pipes 1, each fitted with a toothed segment 33, by means of a common driving motor via a continuous shaft 35 on which there is arranged one pinion for each pipe 1. The continuous shaft 35 can be made up, in known manner, from several units with the assistance of suitable couplings. The shaft 35 may be mounted in fixed bearings which may, for example, be carried by the vertical structural trusses already forming part of the inside of the pen. These details are not illustrated in FIGURE 9.

FIGURE 10 shows in a diagrammatic manner a drive for the pipe 1 with the assistance of a V-belt or a chain drive 36. A driving ring 48 is firmly fixed on the pipe 1, and this driving ring is provided around its periphery with a V-belt pulley or a set of serrations. Around the driving ring 48 a V-belt 36 or a chain is adapted to run, the belt or chain being driven by a motor 38, preferably a geared motor, with the assistance if a V-belt pulley or chain sprocket 37. The driving motor 38 may, for example, be carrier by a bracket 39 or by a vertical truss (not shown) forming part of the structure of the pen.

By the use of driving devices involving motors, for example the driving devices shown in FIGURES 7 to 10, a completely automatic functioning of the feeding device may be obtained in a simple manner with the assistance of a programmed control mechanism 50, schematically illustrated in FIG. 7 wherein 52 represents the motor conductors, 54 the conductors to strips 18 and 56 the conductors to the audible signal 58. In this connection the position of the pipe at a given moment may, for example, be sensed by terminal limit switches (not shown). For example, a projecting switching stud (not shown), may be provided on an end disc 9 of the pipe 1. This switching stud is adapted to actuate a terminal limit switch at the two extreme positions of the turning movement of the pipe, i.e. the feeding position and the neutral position.

Furthermore, as already mentioned, it has proved advantageous to indicate the commencement and termination of the feeding period by audible signals, which it is practical to make different from each other. With this in view the pen may be provided with at least one signal siren 58 which is switched on briefly by the programmed control mechanism (for by hand in the case of non-automatic installations) shortly before the beginning and end of the feeding period. The animals very soon come to recognise the significance of these signals and take up position in front of the pipe 1 when the starting signal sounds and there await rotation of the pipe of the feeding position. Likewise the animals withdraw from the trough when the finishing signal sounds, once they have had some experience of the electric shocks administered by the electric fence 40 and/or the metal strips 18. The switching arrangement for the programmed control mechanism is not illustrated in the drawings or described in greater detail herein because the manner in which such an arrangement is constructed and operated will be readily understood. In an automatic feeding device according to the invention the following working cycle may, for example, by put into operation.

At approximately 15 seconds before the pipe 1 turns to the feeding position the audible starting signal, lasting about 10 seconds, sounds. Then the programmed control mechanism switches the driving motor on for the pipe 1 so that the pipe moves to the feeding position. Attainment of the feeding position is reported by one terminal limit switch to the programmed control mechanism. This then switches the driving motor off. The animals feed. After the predetermined feeding period, for example 2 minutes, has run its course, the audible finishing signal, again lasting about 10, seconds, sounds. At the termination of this signal the metal strips 18 conduct an electric current and the driving motor is switched on to rotate the opposite way. The pipe 1 turns to the neutral position. Attainment of the neutral position is reported to the programmed control mechanism by a second terminal limit switch. This causes the programmed control mechanism to switch the driving motor off. The pipe 1 remains for a predetermined period, for example 1 hour, in the neutral position. After this period of waiting has run its course the programmed control mechanism initiates a new feeding cycle in the manner already described. The waiting periods between feeding periods, and the feeding periods themselves, can be automatically varied as the day progresses; the means required for this and relating to the programmed control mechanism are known per se and are accordingly not described herein in detail.

In order to be sure that there is no possibility of the animals being injured, as an additional safety measure a safety barrier (not shown) may be installed above the trough, fairly close to the electric fence 40; this barrier may be moved to a limited degree in the vertical direction, and when it lifts it may be caused to effect the switching off of the driving device and also to set off an alarm. Such arrangements are already known from other fields of endeavour and are accordingly not described herein or shown in detail.

Other embodiments of the invention are possible within the scope of the following claims.

What I claim is:

1. Feeding apparatus for animals comprising, in combination, an elongated tubular trough having a circumference and a longitudinal axis, a feeding slot defined in said trough circumference providing access into said trough, said slot being defined by first and second longitudinally extending edges spaced apart a circumferential extent less than 180° of the circumference of said trough, an animal barrier located adjacent and above said trough and extending in the axial direction thereof, said barrier defining a first side on which animals are located and a second side removed from animal access, means supporting said trough for rotation about said axis, means for rotating said trough about said axis whereby said slot may be selectively positioned on said first and second sides of said barrier, exposed electric conducting means mounted on said trough and disposed adjacent at least one of said slot edges, and controlled electric means for energizing said conducting means.

2. In a feeding apparatus as in claim 1 wherein said electric conducting means is disposed adjacent the slot edge furtherest removed from said animal barrier when said trough is positioned such that said slot is located on said first side of said animal barrier.

3. In a feeding apparatus as in claim 1 wherein said trough is formed of a dielectric material and said electric conducting means comprises a conductor directly mounted upon said trough.

4. In a feeding apparatus as in claim 3 wherein said trough is formed of glass fibers impregnated with a hardened resin.

5. In a feeding apparatus as in claim 1 wherein said animal barrier includes bare electric conductors.

6. In a feeding apparatus as in claim 1 wherein said means rotating said trough comprise power actuated means, and timed control means controlling operation of said power actuated means.

7. In a feeding apparatus as in claim 6 wherein said timed control means includes said means for energizing said electric conducting means.

8. In a feeding apparatus as in claim 6, audible signal means, said timed control means including means for energizing said signal means.

9. Feeding apparatus for animals comprising, in combination, an elongated tubular trough having a circumference and a longitudinal axis, a feeding slot defined in said trough circumference providing access into said trough, said slot being defined by first and second longitudinally extending edges spaced apart a circumferential extent less than 180° of the circumference of said trough, an animal barrier comprising exposed electrical conductors located adjacent and above said trough and extending in the axial direction thereof, electric means energizing said conductors, said barrier defining a first side on which animals are located and a second side removed from animal access, means supporting said trough for rotation about said axis, means for rotating said trough about said axis whereby said slot may be selectively positioned on said first and second sides of said barrier, said slot rotating under said barrier when rotating from said first side to said second side wherein the slot edge furtherest from said barrier tends to lift an animal's nose within said slot toward said barrier when said trough rotation positions said slot from said first side to said second side, signal means perceptible to animals having selective access to said trough and means controlling actuation of said signal means in conjunction with rotation of said trough whereby said signal means is energized a predetermined time interval prior to rotation of said trough.

References Cited

UNITED STATES PATENTS

| 2,794,576 | 6/1957 | Reynolds | 119—53 X |
| 3,112,731 | 12/1963 | Lako et al. | 119—51.12 |
| 3,111,115 | 11/1963 | Best | 119—52 |

FOREIGN PATENTS 402,923  10/1909  France.

HUGH R. CHAMBLEE, *Primary Examiner.*